March 9, 1937.　　W. LINTERN ET AL　　2,073,159
VEHICLE VENTILATING AND SIGNAL UNIT
Filed Jan. 15, 1935

INVENTORS
William Lintern
John B Lintern
BY
Soule & Leonard
ATTORNEYS

Patented Mar. 9, 1937

2,073,159

UNITED STATES PATENT OFFICE 2,073,159

VEHICLE VENTILATING AND SIGNAL UNIT

William Lintern and John B. Lintern, Cleveland, Ohio, assignors, by mesne assignments, to Evans Products Company, Detroit, Mich.

Application January 15, 1935, Serial No. 1,916

7 Claims. (Cl. 98—2)

This invention relates to a vehicle ventilating and signal unit particularly adapted for use in connection with closed vehicle bodies such as motor truck cabs and the like.

Statutes of many States require that motor trucks and other commercial vehicles operating on the highways shall carry signal lights or other indicia readily discernible at night at the front of the top of the vehicle. Quite often it is desirable to supplement these signals with advertising indicia and signs which may be illuminated to augment the benefits of the signals, and also to indicate destination of the truck or to advertise the owner or his products. Due to weather conditions such as snow, rain and the like, it often happens that the signals and signs are obscured by the accumulation of snow, water and ice thereon.

The desirability of proper ventilation of the cab or vehicle and reduction of dangers from fumes and the like is, of course, generally appreciated.

It is one of the principal objects of the present invention to provide a combined ventilating and signal unit in which the essential ventilator parts and the operation of the ventilator not only effect the desired ventilating conditions within the vehicle body but also serve to augment the efficiency of the signs and signals.

A more specific object is to provide a ventilator which may readily be attached to the roof of the present day commercial vehicles near the front wall in which position it may support and provide a weatherproof housing for the required signals, signs and illuminating means, and which operates to prevent the accumulation of snow, ice and the like on the signals and signs by proper application of the air circulated for ventilation.

Another object is to provide a unit of this character which, when installed, is pleasing in appearance and conforms with the general contour characteristics of the body and which reduces the usual back drag on the signals and signs with its resultant stress and damaging vibrations thereof and the deposition of snow and ice on the parts thereof.

Figure 1:
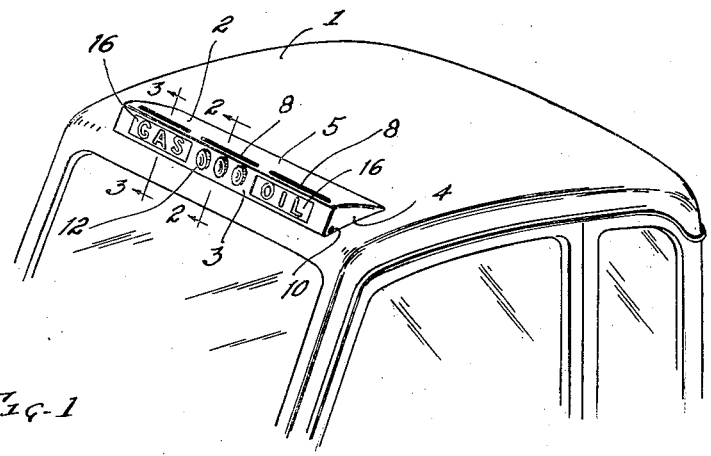
Figure 2:
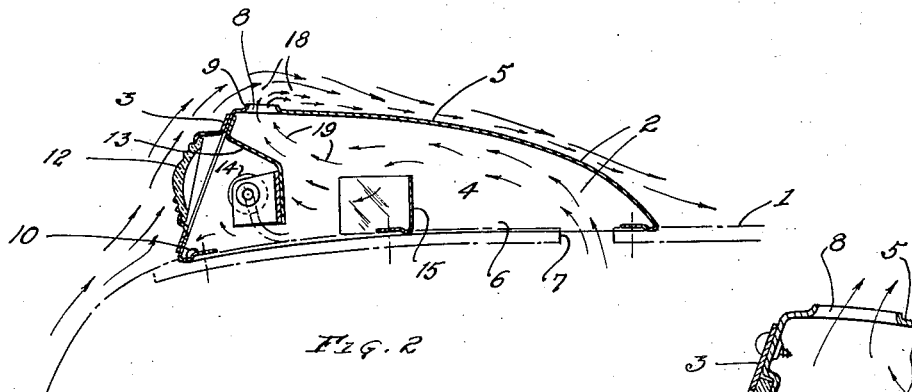
Figure 3:
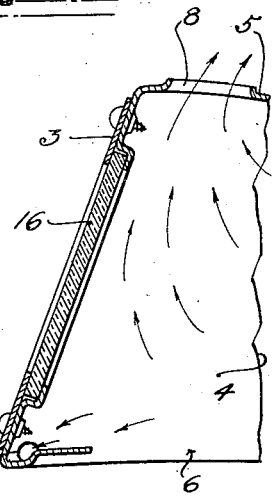
Figure 4:
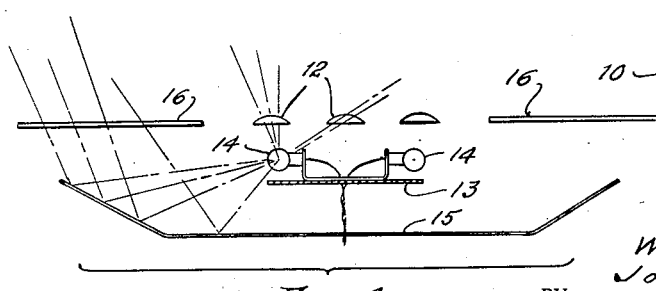

Other objects and advantages will become apparent from the following specification wherein reference is made to the drawing in which Fig. 1 is a fragmentary perspective view of a motor truck cab showng a preferred embodment of the vehicle ventilating and signal unit of the present invention installed;

Figs. 2 and 3 are cross sectional views of the ventilating and signal unit, showing the details of structure thereof, its relation to the roof of the vehicle body and the air currents utilized; and Fig. 4 is a diagrammatic plan view of the interior of the unit showing the manner in which the signal lights are utilized for illuminating the signs and other indicia in the front wall of the unit.

Referring to Fig. 1, the unit is shown as installed on the roof or top wall of a body 1 of a motor vehicle. The unit, designated generally as 2, comprises a substantially upright front wall 3, with side walls 4 extending rearwardly therefrom, and a top wall 5 which, at its forward edge, merges with the upper edge of the front wall 3 and is curved downwardly rearwardly therefrom so that the hood presents a smooth streamlined contour from the front wall rearwardly. The walls are of such shape and height that the bottom limits of the hood conform generally with the surface contour of the roof or top wall of the particular vehicle body roof portion with which it is to be associated and it is sealed in engagement therewth.

The hood is preferably elongated transversely so as to extend substantially across that portion of the width of the roof which terminates laterally at the rounded side portions of the roof where the roof merges with the side walls of the vehicle body. The hood is preferably located, with respect to the vehicle body, so that its front wall is positioned as close as practicable to the plane of the front wall of the vehicle body so that the relatively onrushing air stream deflected upwardly by the front wall of the body passes along the front wall of the hood.

The hood is shown as open at the bottom, as indicated at 6, so that it may be placed in communication with the interior of the vehicle body; for example, by means of an opening 7 in the roof of the vehicle body, the roof of the body forming the floor of the hood in effect. In the top wall 5 of the hood, near its juncture with the front wall, and as close as practicable thereto, are air ejector means comprising vents 8 which open upwardly through the wall 5. These vents are comparatively narrow fore and aft of the hood and are elongated transversely of the hood so as to form an ejector passage means substantially coextensive with the transverse limits of the hood. A slight upturned flange 9 may be provided around each of the openings to prevent the flow of water thereinto when the vehicle is not in motion.

Substantially at the base of the hood, in the forward portion of the side walls 4, near their juncture with the front wall, are ejector openings 10 through which any water or foreign matter entering the hood may be withdrawn when the vehicle is in motion and which, with the vents 8, effect the proper application of air ejected from the body for augmenting the efficiency of the signs and signals in a manner later to be described.

As stated, it is required in many states that a series of illuminated signals be provided near the front part of the roof of each truck cab, and that these be exposed forwardly of the vehicle. Accordingly, in the front wall 3 of the hood, a number of translucent signal lenses 12 are provided, corresponding in number and color to the requirements of the particular state. Within the hood 2, rearwardly from the front wall, is disposed a support 13 on which are carried a plurality of light bulbs 14 positioned to the rear of the lenses 12 for passing light therethrough. Rearwardly from the support 13 is a baffle wall 15 which preferably extends from the roof of the vehicle upwardly a short distance and transversely of the hood a sufficient distance to prevent any water or foreign matter entering the forepart of the hood from draining into the opening 7 in the roof of the vehicle body 1. The baffle 15 is provided on its forward face with a reflecting surface, and the end portions of the baffle may be turned forwardly at a slight angle as better illustrated in Fig. 4 so that the light from the bulbs 14 will strike the baffle at the proper angle of incidence to be reflected to the front wall of the hood at each side of the signal lights 12.

In the front wall of the hood at each side of the signal lights, are panels 16 which are preferably translucent and bear desired advertising or other indicia which are readily observable from the outside at night when the panels are illuminated from within. Thus the light from the bulbs 14, which would otherwise be wasted, is utilized in illuminating the panels 16, thereby augmenting the visibility of the vehicle as it approaches and at the same time providing effective advertising or other information.

Referring next to the operation and advantages of the unit, it is apparent that as the vehicle moves forwardly the relatively rearwardly onrushing stream of air impinging on the front wall of the vehicle will be deflected upwardly and flow over the roof near the upper level of the roof. This deflected air stream impinges on the air stream above the upper limit of the body. By providing a hood such as described and placing it with its front wall near the plane of the front wall of the body, the entire front face of the wall 3, including the signal lenses 12 and the panels 16, is swept by a high velocity air stream of large volume which travels upwardly along the front wall of the hood and passes into the relatively rearwardly moving air above the upper limit of the hood. Since the wall 5 slopes gradually downwardly and rearwardly from the wall 3, any eddy currents and back drag which would normally be occasioned by the impingement of the two such high velocity air streams is reduced to a minimum with the result that swirling of the air and deposition of dust, snow, sleet etc. on and around the unit is greatly reduced. Since the flow is smooth, vibration and "back drag" on the unit and vehicle are greatly reduced. At the same time the two air streams cooperate to provide a low pressure zone of very great intensity near the forward portion of the top of the hood, as indicated generally at 18. The openings 8 are positioned so that they open into this low pressure area and thereby render this zone effective for sucking air from within the hood and consequently, through the medium of the passage 7, from within the body. However, since perfect streamlining is impracticable, the extraneous air would tend to swirl and deposit snow, sleet and the like upon the roof of the cab or hood to the rear of the openings 8. This tendency is greatly reduced by the shape of the hood which, as stated, is generally streamlined rearwardly. This is additionally reduced by virtue of the fact that the air leaving the body, as indicated by the arrows 19, relieves the low pressure zone 18 concurrently with its formation, and thus smoothes out the flow of air rearwardly over the hood so that a swift rearwardly moving stream comparatively free from eddy currents is provided for continuously sweeping the hood.

Due to the entrance of the warm air from the body, the top wall 5 of the hood is somewhat raised in temperature, which to some extent, prevents the formation and accumulation of ice and snow thereon. It is apparent, however, that the warm air 19 leaving the body is entrapped between the wall 5 and the extraneous air stream flowing thereover so that both the inside and outside of the hood are washed with warm air which quickly relieves the hood of ice and snow or prevents these formations.

While the stream of air sweeping the front wall of the ventilating and signal unit would of itself greatly reduce the accumulation of ice and snow on the front wall 3, nevertheless, under severe conditions there will be some accumulation. Due, however, to the action of the vents 8 and 10 the warm air from within the body is continuously passed over the inner surface of the front wall, including the inner face of the panels 16 as well as the signal lenses 12. This eliminates the accumulation of moisture on the inner faces of the panels and within the hood, and also on the light bulbs and mounting. Furthermore, by virtue of the heating of the front panels and signals by the continuous bath of warm air passing through the hood from within the body, the temperature of the panels is maintained at such a temperature that snow and ice are readily melted at least sufficiently to be removed by the outer air stream and the panels are dried quickly after cessation of rain, snow or sleet. Thus the air stream, rushing over the front wall 3 without being "choked" or reduced by eddy currents, not only reduces or prevents the deposit of snow and the like by itself on the wall 3, but, due to the shape of the unit and the utilization of the vitiated air, removes that deposit accumulated while the vehicle has been stopped.

It is apparent from the foregoing description that by combining the ventilating and signals in a single unit arranged as described, new cooperative results are obtained which are of very material advantage in the reduction of damaging wind vibrations and especially in the benefits which the signs and signals derive from the utilization of the air in the body and action of the outside air currents which generally are placed to no advantage.

Having thus described our invention,

We claim:

1. A ventilating unit for vehicle bodies comprising a transversely elongated hood having side walls and a substantially upright front wall, a top wall extending rearwardly from the upper limit of the front wall and sloped gradually downwardly rearwardly therefrom, said front wall sloping upwardly rearwardly from its bottom edge to its top limit continuously and said walls providing continuous wall surfaces, said hood having side walls merging with the front and top walls and closing the ends of the hood and said hood having an opening at the bottom adapted for communication with the interior of the vehicle body with which it is to be associated, whereby on forward motion of the vehicle body air is deflected upwardly along said front wall and above the top wall and creates a low atmospheric pressure zone extending rearwardly along the top wall of the hood from the fore portion, and an opening in said top wall of the hood communicating directly with said low pressure zone.

2. In a vehicle body having a roof and front wall, a hood extending and elongated transversely of the roof and having a front wall disposed near the front of the roof, and extending upwardly rearwardly from its juncture with the roof, a top wall and side walls extending rearwardly from said front wall and merging with each other, said hood being streamlined from the front wall rearwardly, whereby air impinging on the front wall is deflected in a well defined high velocity stream around the hood and eddy currents and back pressure are reduced, and having an air ejection opening in the top wall behind and closely adjacent its front wall said front wall forming substantially a continuation of the vehicle front wall.

3. A ventilating and signal unit for vehicle bodies comprising a transversely elongated hood having side walls and a substantially upright front wall, said front wall including visual signal means, a top wall extending rearwardly from the upper limit of the front wall and sloped downwardly and rearwardly therefrom, said front wall sloping upwardly rearwardly from its bottom edge to its top limit continuously and said walls providing continuous wall surfaces, said hood having side walls merging with the top and front walls and closing the ends of said hood and said hood having an opening at the bottom adapted for communication with the interior of the vehicle body with which it is to be associated, whereby on said motion of the vehicle body, air is deflected upwardly along said front wall and above said top wall and creates a low atmospheric pressure zone extending rearwardly along the top wall of the hood from the fore portion and an opening in said top wall of the hood communicating directly with said low pressure zone.

4. In a vehicle body having a roof, a combination ventilator and signal means mounted on said roof, said means comprising a stream-lined shell including top, side and front walls merging one into the other mounted transversely of said roof, the forwardly facing wall of said shell including visual signal means and having a forwardly exposed surface protruding above that portion of the roof on which said means is mounted, means forming an ejector passage in the top of said shell closely adjacent said forwardly facing wall communicating with the interior of said shell, and means communicating the interior of said shell with the interior of said vehicle, the construction and arrangement being such that warm air is withdrawn from the interior of the vehicle into the shell to prevent the formation of ice or snow on the signal means.

5. In a vehicle body having a roof, a combination ventilator and signal means mounted on said roof, said means comprising a stream-line shell including top, side and front walls merging one into the other mounted transversely of said roof, the forwardly facing wall of said shell including visual signal means and having a forwardly exposed surface protruding above that portion of the roof on which said means is mounted, a lamp mounted within said shell, means forming an ejector passage in the top of said shell closely adjacent said forwardly facing wall communicating with the interior of said shell, and means communicating the interior of said shell with the interior of said vehicle, the construction and arrangement being such that warm air is withdrawn from the interior of the vehicle into the shell to prevent the formation of ice or snow on the signal means.

6. In a vehicle body, a front vehicle body wall, a vehicle roof merging with said front vehicle body wall and extending rearwardly therefrom, a combination ventilator and signal means mounted on said roof adjacent the juncture of said roof with said front vehicle body wall, said means comprising a stream-line shell including top, side and front walls merging one into the other mounted transversely of said roof, the forwardly facing wall of said shell including visual signal means and having a forwardly exposed surface protruding above that portion of the roof on which said means is mounted, a lamp mounted within said shell, means forming an ejector passage in the top of said shell closely adjacent said forwardly facing wall communicating with the interior of said shell, and means communicating the interior of said shell with the interior of said vehicle, the construction and arrangement being such that warm air is withdrawn from the interior of the vehicle into the shell to prevent the formation of ice or snow on the signal means.

7. In a vehicle body having a roof, a combination ventilator and signal means mounted on said roof, said means comprising a stream-lined shell including top, side and front walls merging one into the other mounted transversely of said roof, the forwardly facing wall of said shell including visual signal means and having a forwardly exposed surface protruding above that portion of the roof on which said means is mounted, means forming an ejector passage in the top of said shell closely adjacent said forwardly facing wall communicating with the interior of said shell, means forming a drain and air ejector passage in the side of said shell adjacent the bottom and front wall thereof, and means communicating the interior of said shell with the interior of said vehicle, the construction and arrangement being such that warm air is withdrawn from the interior of the vehicle into the shell to prevent the formation of ice or snow on the signal means.

WILLIAM LINTERN.
JOHN B. LINTERN.